July 24, 1962     H. W. HEIDERGOTT     3,045,819
ARTICLE ADVANCING AND EJECTING APPARATUS
Filed June 18, 1959     5 Sheets-Sheet 1

INVENTOR
H.W. HEIDERGOTT
BY R. P. Miller
ATTORNEY

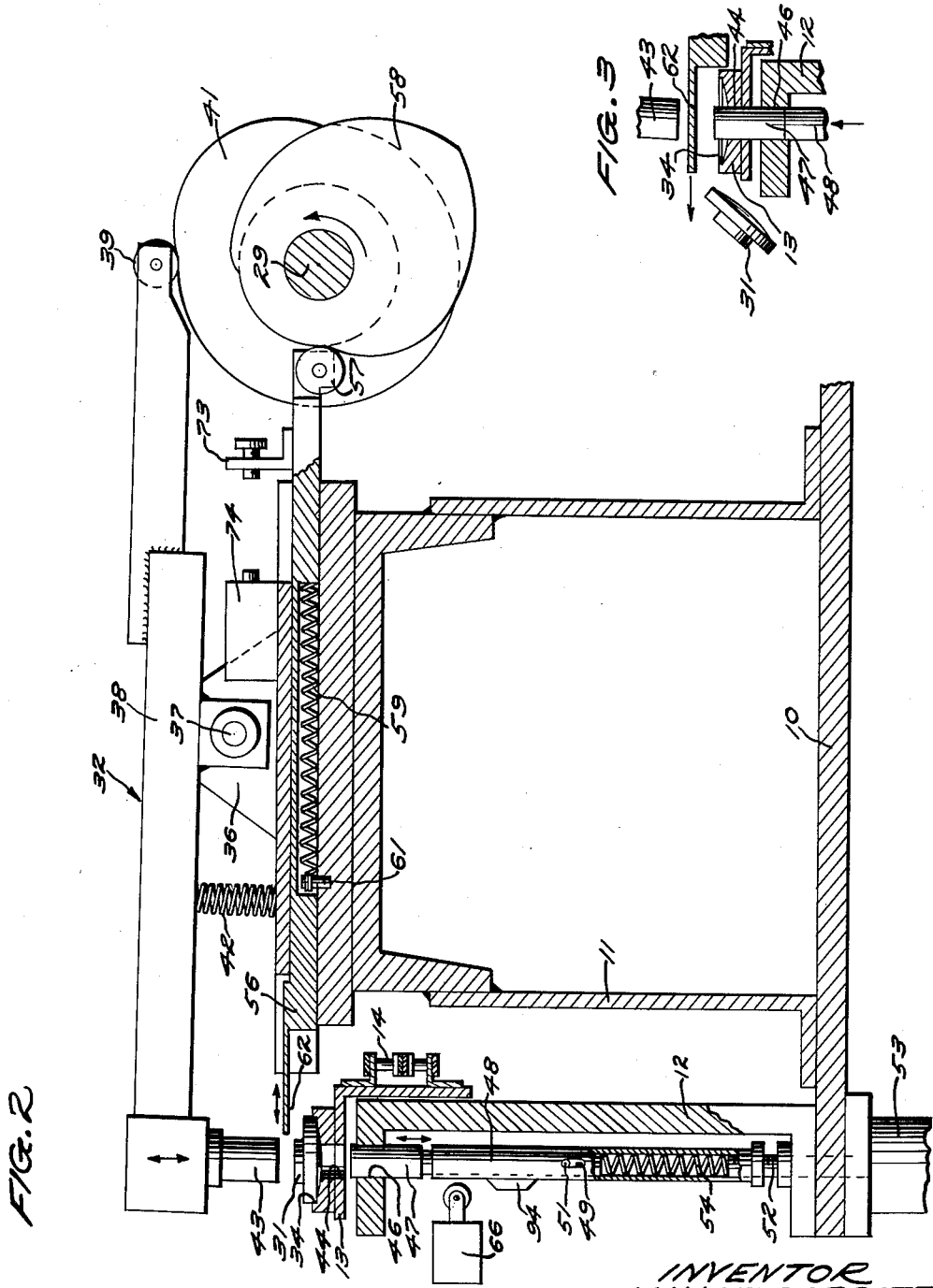

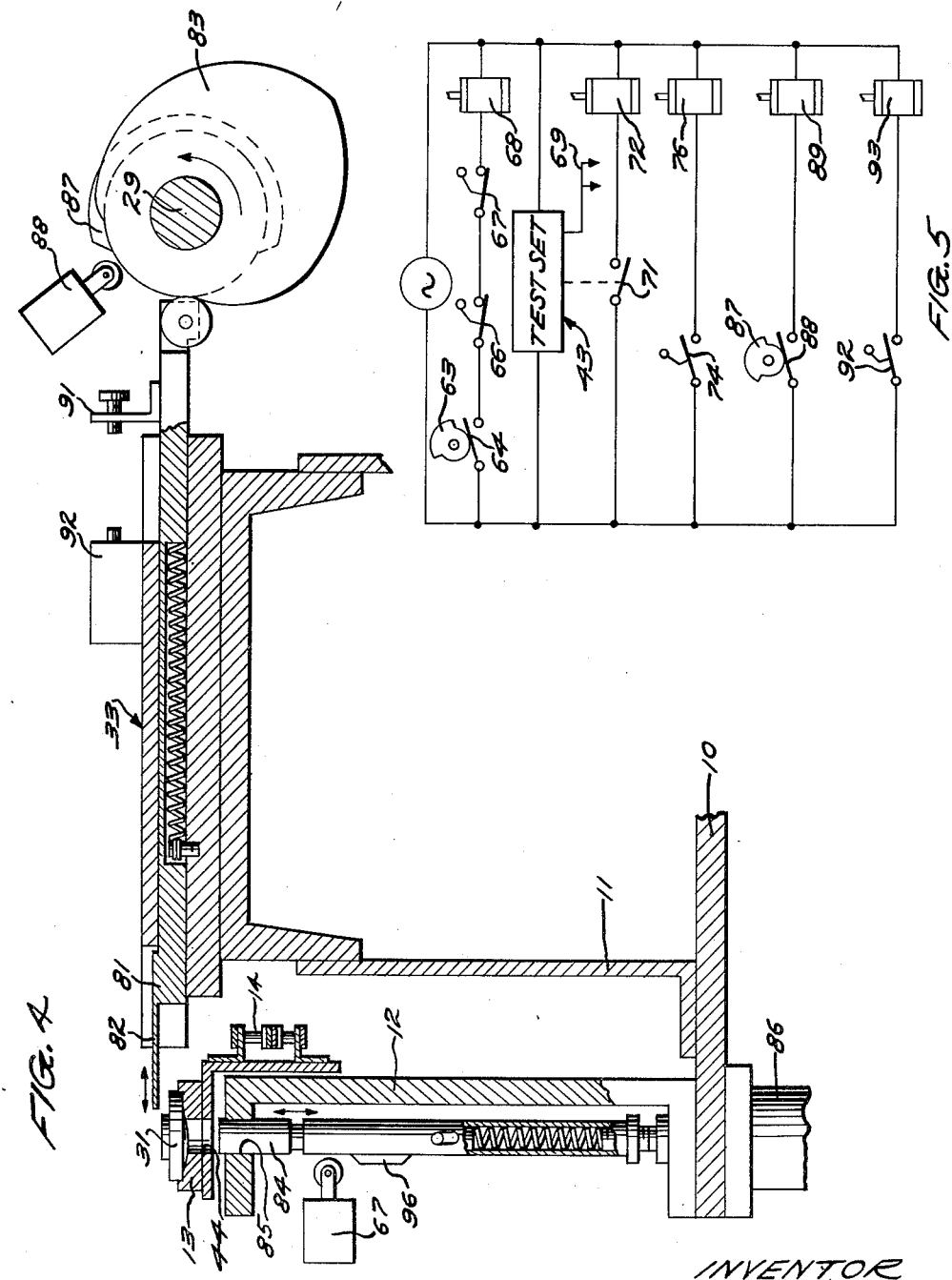

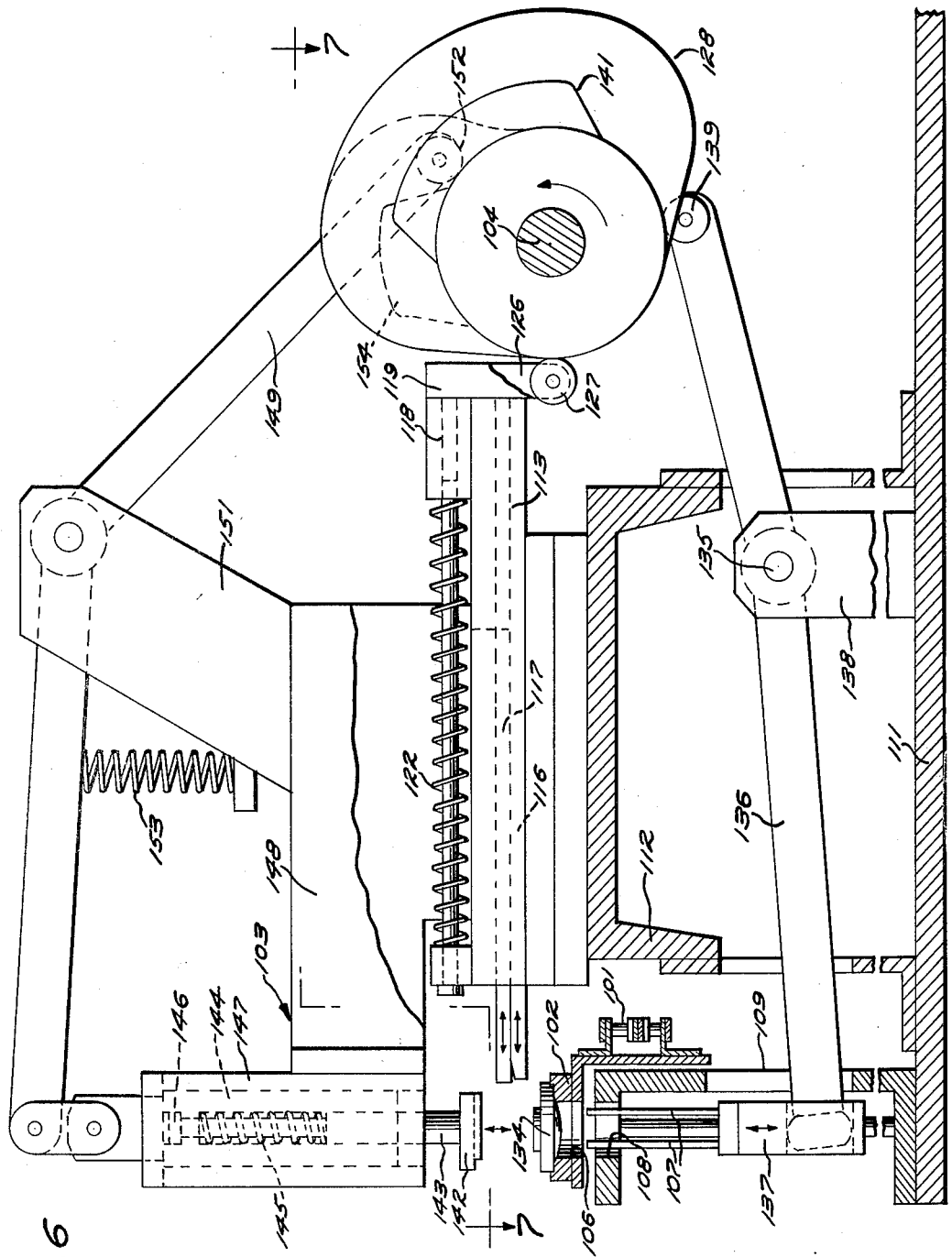

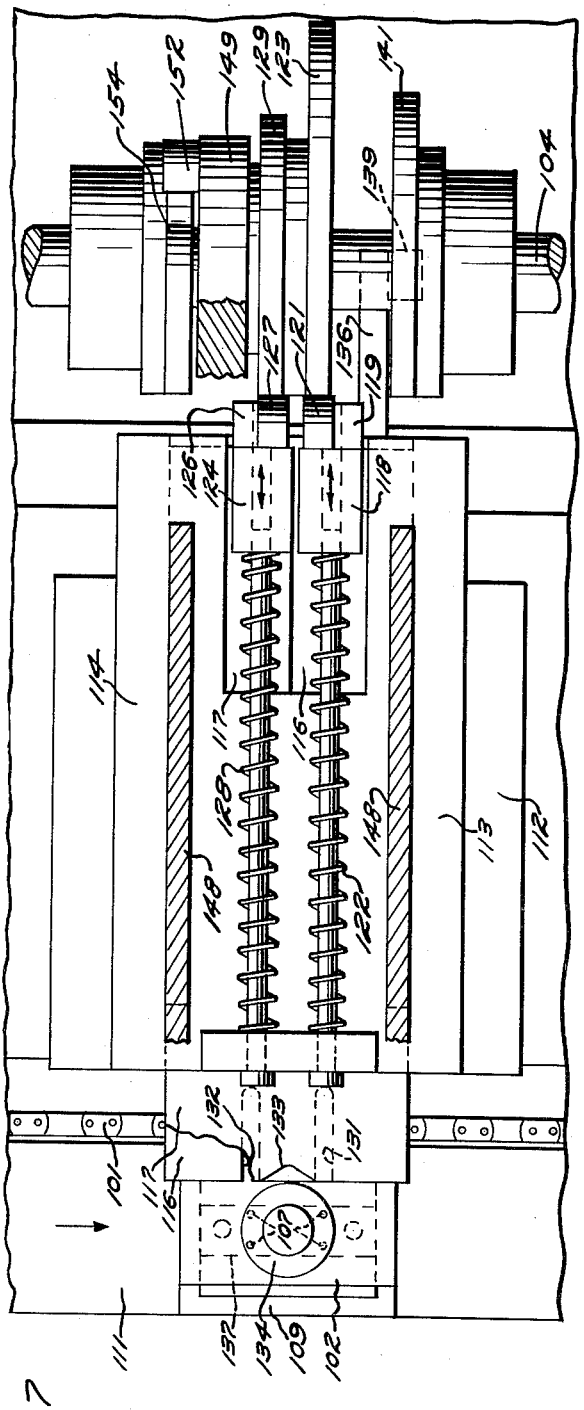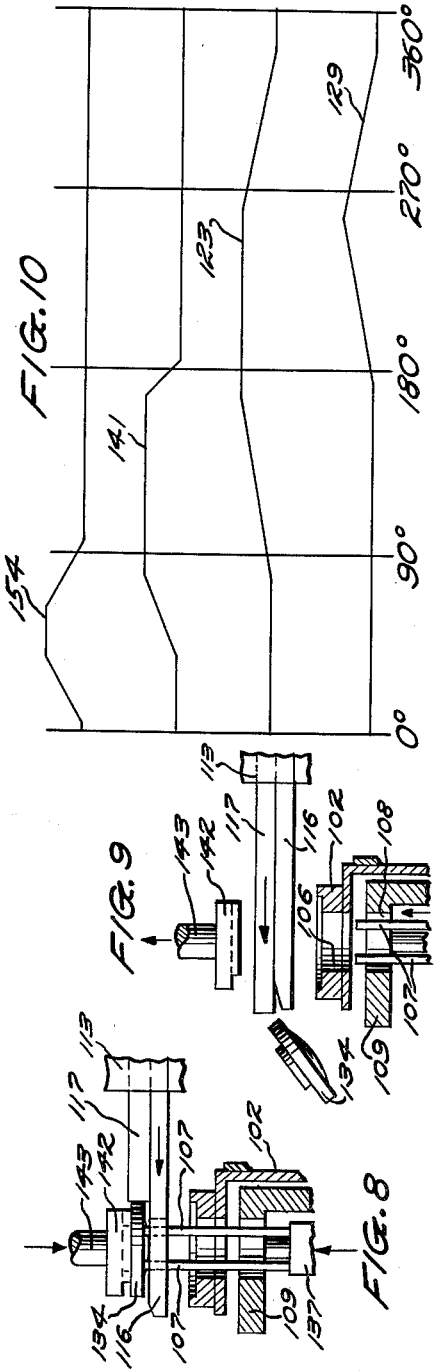

United States Patent Office 3,045,819
Patented July 24, 1962

3,045,819
ARTICLE ADVANCING AND EJECTING
APPARATUS
Harry W. Heidergott, Indianapolis, Ind., assignor to
Western Electric Company, Incorporated, New York,
N.Y., a corporation of New York
Filed June 18, 1959, Ser. No. 821,150
14 Claims. (Cl. 209—74)

This invention relates to article advancing and ejecting apparatus, and more particularly to a system including a conveyor for sequentially advancing articles to stations whereat either selectively or cyclically operated facilities are rendered effective to elevate each article whereafter a cyclically operated ejector removes each article from the elevating facilities.

In automatic article fabricating installations, it is often necessary to advance articles by a conveyor having recesses or pockets formed therein to retain the articles. The use of such a conveyor system requires special types of simple and efficient ejector mechanisms for either selectively or cyclically removing articles from the recesses or pockets and ejecting the removed articles into suitable receptacles or chutes.

A prime object of the present invention resides in a new, improved and economical article advancing and ejecting apparatus.

Another object of the invention is the provision of a conveyor operable in conjunction with an elevating device that functions to lift articles from the conveyor into the path of a cyclically operating ejector.

A further object of the invention resides in a conveyor system for advancing articles to a test station whereat facilities are selectively rendered effective to elevate articles having predetermined characteristics and thereupon ejecting the articles.

A still further object of the invention resides in a cyclically operating conveyor for advancing articles in a first direction whereafter a mechanism operating in a transverse direction lifts the articles from a conveyor into the path of an ejector operating in a direction that is transverse to both the direction of movement of the conveyor and lifting mechanisms.

An additional object of the invention is the provision of a mechanism for engaging and lifting an article from a conveyor whereafter the article is deposited on a support and then ejected therefrom.

With these and other objects in view, the present invention contemplates the use of a conveyor having carriers provided with nests for receiving articles. Each carrier is advanced into an ejector station whereat either cyclically or selectively operated facilities are rendered effective to elevate the article into a position to be engaged and ejected by a cyclically operated pusher.

In a further embodiment of the invention, the elevator facilities include a series of spaced pins that are moved through each carrier to elevate an article from the nest against the action of a spring-loaded pressure pad. A holding support is moved between the pins, and the pins are withdrawn along with the pressure pad leaving the article deposited on the support. A cyclically operated ejector thereupon functions to remove the article from the holding support.

Other objects and advantages of the present invention will be apparent from the following detailed description when considered in conjunction with the accompanying drawings, wherein—

FIG. 2 is a sectional view taken along line 2—2 of FIG. 1 illustrating a selectively operated ejector mechanism;

FIG. 3 is a fragmentary sectional view of the ejector mechanism shown in FIG. 2 in an ejecting position;

FIG. 4 is a sectional view taken along line 4—4 of FIG. 1 showing a cyclically operated ejector mechanism;

FIG. 5 is a simplified diagram of a circuit for controlling the conveyor system and ejector mechanisms shown in FIGS. 1–4;

FIG. 6 is a side elevational view of another embodiment of a cyclically operating ejector mechanism embodying the principles of the invention;

FIG. 7 is a top plan view taken along line 7—7 of FIG. 6 illustrating the ejector mechanism and control cams;

FIGS. 8 and 9 are side views partially in section of the ejector mechanism during two different positions in a cycle of operation, and FIG. 10 is a timing diagram illustrating the sequence of operation of a series of cams for controlling the embodiment of the invention shown in FIGS. 6–9.

Figure 1:
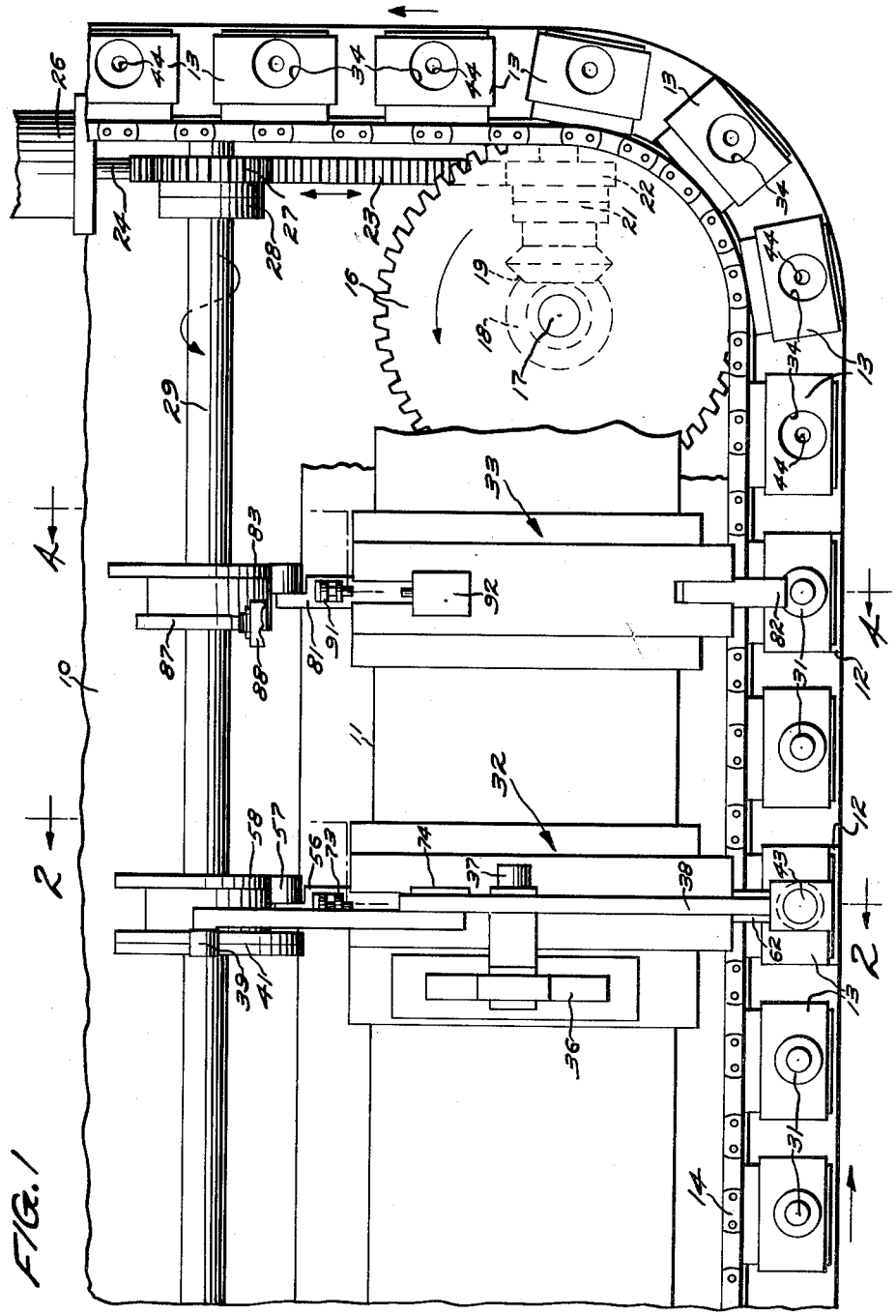
FIG. 1 is a top plan view of a conveyor system having ejector facilities constructed in accordance with the principles of the invention.

Referring first to FIGS. 1, 2 and 4, there is shown a base plate 10 having a frame 11 secured thereto. A C-shaped frame plate 12 is also secured to the base plate 10. Slidably mounted on the upper surface of the frame plate 12 is a series of carriers 13 each attached to a chain 14 adapted to be driven by a sprocket 16 that is secured to a drive shaft 17. A beveled gear 18 attached to the shaft 17 meshes with a second beveled gear 19 to receive motion through a uni-directional clutch 21. The clutch 21 is driven by a pinion 22 that cooperates with a rack 23. A piston rod 24 is attached to the rack and is adapted to be reciprocated by an air cylinder 26. The rack 23 also cooperates with a second uni-directional clutch 28 to drive a cam shaft 29.

When air is applied to the cylinder 26, the rack 23 is advanced to rotate the pinions 22 and 27; however, motion is only imparted through the clutch 28 to the shaft 29. Upon reversal of the direction of movement of the rack 23, motion is only imparted through the clutch 21 to the beveled gears 19 and 18 to drive the shaft 17 and the sprocket 16 whereupon the chain 14 is advanced to move each carrier 13 a predetermined distance.

The carriers are adapted to be advanced around the top of the frame plate 12 to move a work piece 31 through a series of fabricating machines (not shown) and then into a test station 32. The test station includes facilities for testing the characteristics of the article 31 and thereupon accordingly controlling the operation of ejecting facilities. Those articles that are not ejected at station 32 are advanced into a cyclically operating ejecting station generally designated by the reference numeral 33, wherein each article is lifted from the carrier 13 and ejected from the overall apparatus.

Attention is now directed to FIGS. 2 and 3, wherein the details of construction of the testing and ejecting station 32 are disclosed. It will be noted that the article 31 rests within a recess 34 formed in the carrier 13. At this station there is mounted a bracket 36 from which extends a stud shaft 37 that provides a pivot mounting for a lever 38. One end of the lever has mounted thereon a cam follower roller 39 that is adapted to ride upon a cam 41 mounted on the shaft 29. A compression spring 42 exerts a continual force on the lever 38 tending to urge the roller 39 into engagement with the cam 41. A test head or probe 43 is mounted on the lefthand extremity of the lever 38 and is adapted to be moved into engagement with an article 31 positioned in an aligned carrier 13.

The carrier 13 is also provided with a bore or aperture 44 that in turn is aligned with an aperture 46 formed in the C-shaped frame plate 12. Slidably mounted within this aperture 46 is a plunger 47 extending within a sleeve 48. The sleeve 48 is provided with an elongated slot 49 for receiving a pin extending from the plunger 47. The sleeve 48 is threaded and attached to a threaded end of a piston rod 52 which in turn is adapted to be selectively positioned by the operation of an air cylinder 53. Interposed between the top of the piston rod 52 and the bottom of the plunger 47 is a compression spring 54 urging the plunger 47 to move in an upwardly direction, which movement is limited by engagement of the pin 51 with the top of the slot 49.

Slidably mounted on the frame 11 is a slide 56 having a cam follower roller 57 mounted on the righthand extremity to engage a cam 58 secured to the shaft 29. A compression spring 59 secured at one end to a pin 61 is adapted to urge the slide 56 and hence the roller 57 into engagement with the cam 58. Secured to the lefthand section of the slide 56 is an ejector plate 62 positioned so that upon movement thereof toward the left, the plate will not strike an article 31 positioned in the carrier 13.

In order to better understand the operation of the testing and ejecting station 32, reference should be had to FIGS. 1, 2 and 3 in conjunction with the circuit diagram shown in FIG. 5. A continually rotating timer cam 63 closes a contact 64 to complete an energizing circuit through contacts 66 and 67 to a solenoid 68 that functions to control a valve to admit air to the cylinder 26. The piston 24 is withdrawn within the cylinder 26, and the rack 23 drives the pinion 22 and the clutch 21 to impart movement through the beveled gears 19 and 18 and the shaft 17 to the sprocket 16, whereupon the sprocket advances the chain 14 to position a first carrier 13 in the testing station 32 and a second carrier in the ejecting station 33. When the contact 64 is opened by the timing cam 63, the solenoid 68 is denergized whereupon the air applied to the cylinder 24 is reversed to advance the piston rod 24 and rack 23 to rotate the pinion 27 and the clutch 28 to drive the cam shaft 29. The cam 41 thereupon acts on the follower 39 to pivot the lever 38 about the stud shaft 37 thereby moving the test head 43 into engagement with the article 31. The test head 43 includes a pair of probes 69 that function to check the continuity of the article 31, and if the test head ascertains that the article is defective, a contact 71 is closed to energize a solenoid 72.

Solenoid 72 controls the admission of air to the cylinder 53 whereupon the piston rod 52 moves the plunger 47 through the apertures 46 and 44 to lift the article 31 into the path of movement of the ejector plate 62. The cam 41, however, is effective to withdraw the head 43 prior to the advance of the plunger 47. The cam 58 is now effective to move the slide 56 toward the left thereby permitting the ejector plate 62 to engage and move the defective article 31 from the plunger 47 (see FIG. 3). It is to be understood that the test probe could be utilized to test for satisfactory articles and upon ascertainment of a satisfactory article or any predetermined condition in the article, the contact 71 would be closed and the plunger 47 would be moved to advance the article into position to be engaged and ejected by the plate 62.

When the slide 56 moves forward, an actuator 73 engages and operates a switch 74. Closure of switch 74 completes an energizing circuit for a solenoid 76 that functions to reverse the direction of air applied to the cylinder 53, whereupon the plunger 47 is withdrawn in anticipation of another cycle of operation.

Referring to FIG. 4, there is shown the details of the ejector station 33 which functions to eject all articles from the carriers 13 that have not been previously ejected at station 32. A slide 81 having an ejector plate 82 is adapted to be reciprocated by a cam 83 mounted on the shaft 29. A plunger 84 is mounted to move through an aperture 85 formed in frame plate 12 and an aligned aperture 44 by the operation of an air cylinder 86. The plunger 84 is similar in construction to the plunger 47. There is also mounted on the shaft 29 a cam 87 adapted to close a contact 88 to complete an energizing circuit for a solenoid 89 which functions to control the admission of air to the cylinder 86. The cylinder 86 elevates the plunger 84 whereupon the article 31 is moved into the path of movement of the ejector plate 82 thus effectuating a discharge of the article 31.

The slide 81 has an actuator 91 mounted thereon to close a switch 92 that functions to energize a solenoid 93. This solenoid controls the reversal of air to the cylinder 86 thereupon causing the air cylinder to retract the plunger 84 in anticipation of another cycle of operation. It may be appreciated that following each advance of the carriers 13, the plunger 84 and ejector plate 82 are operated to eject an article 31.

It will be noted that as the plungers 47 and 84 are advanced, switch actuator cams 94 and 96 open switches 66 and 67 to preclude the energization of the solenoid 68; thus, no indexing can take place until the plungers 47 and 84 are in the withdrawn position. This safety feature precludes the advance of the carriers 13 while either of the plungers 47 or 84 is positioned within a carrier.

Attention is now directed to FIGS. 6–10, wherein there is disclosed an additional embodiment of the invention. In this embodiment a chain 101 is again indexed to advance carriers 102 into a cyclically operated ejector mechanism 103, which is controlled by the rotation of a cam shaft 104. The same mechanism described with respect to the embodiment shown in FIGS. 1–5 is utilized to alternately index the chain 101 and rotate the shaft 104. The carrier 102 again has an opening 106 formed therein which is moved into alignment with a series of four pins 107 extending through an aperture 108 formed in a C-shaped frame plate 109 attached to a base 111.

The base 111 has attached thereto a frame 112 onto which is mounted a pair of guide plates 113 and 114. Slidably mounted between the guide plates 113 and 114 is a support plate 116 onto which is slidably mounted an ejector plate 117. The righthand extremity of the support plate 116 has attached thereto an abutment 118 from which depends an arm 119 onto which is mounted a cam follower roller 121. A compression spring 122 acts against the abutment 118 to urge the roller 121 into engagement with a cam 123 mounted on the shaft 104. The righthand extremity of the slide 117 is provided with an abutment 124 having a dependent arm 126 for supporting a roller 127. A compression spring 128 engages and urges the abutment 124 to move the roller 127 into engagement with a cam 129.

The forward or lefthand extremity of the slide 116 is provided with a pair of slots 131 and 132 that are adapted to receive the pins 107 when the slide 116 is moved toward the left. The lefthand extremity of the ejector slide 117 is provided with a notch 133 that fits around a portion of an article 134 that is elevated from the carrier 102. In order to lift the pins 107 to elevate the article 134, a lever 136 is provided to engage and move a slide block 137. The lever 136 is mounted on a shaft 135 that in turn is mounted in a bracket 138 extending from the base 111. The righthand extremity of the lever 136 is provided with a cam follower roller 139 that is adapted to follow the contour of a cam 141 also mounted on the shaft 104.

In order to hold the article 134 in position during elevation, a pressure pad 142 is provided. This pressure pad is attached to a rod 143 slidably mounted within a cylindrical member 144. A compression spring 145 mounted about a reduced section of the rod 143 urged the rod in a downward direction. A collar 146 mounted on the rod engages a recessed portion of the member 144 to limit downward movement of the rod relative to the member 144. The cylindrical member 144 is slidably mounted in a sleeve guideway 147 attached to a bracket 148 extending from the frame 112. The upper extremity of the member 144 is attached to a lever 149 pivotally mounted in an extension 151 of the bracket 148. Attached to the righthand end of the lever 149 is a cam follower roller 152 that is urged by a compression spring 153 to follow the contour of a cam 154.

The operation of this embodiment of the invention may be more readily understood by reference to FIG. 10 in conjunction with the other figures. When a carrier 102 is advanced into the ejecting mechanism 103, the cam shaft 104 is initiated into a cycle of rotation whereupon the cam 154 is rendered effective to pivot the lever 149 to move the pressure pad 142 into engagement with the article 134. Further rotation of the shaft 104 causes the cam 141 to pivot the lever whereupon the pins 107 move in an upwardly direction to lift the article 134 against the pad 142, whereupon the spring 145 is compressed. As soon as the article 134 is moved to the elevated position, the cam 154 presents a low portion of the cam follower 152 thus the lever 149 is pivoted to remove the pressure pad 142 from engagement with the article. Next, the cam 123 is rendered effective to move the cam follower roller 121 toward the left thereby advancing the lefthand extremity of the slide 116 beneath the elevated article 134 (see FIG. 8). This movement is permitted due to the formation of slots 131 and 132 in the slide 116 which accommodate the pins 107. The cam 141 now pivots the lever 136 to withdraw the pins 107. Further rotation of the shaft 104 renders the lobe portion of the cam 129 effective to move the cam follower roller 127 toward the left. The slide 117 is thus moved to the left relative to the slide 116 to eject the article 134 from the slide 116 (see FIG. 9). The cams 123 and 129 are now rotated to present low sections to the cam follower rollers 121 and 127 thus permitting the springs 122 and 128 to restore the slides 116 and 117 to the initial position in anticipation of another cycle of operation of the overall machine.

It is to be understood that the above-described arrangements of apparatus and construction of elemental parts are simply illustrative of an application of the principles of the invention and many other modifications may be made without departing from the invention.

What is claimed is:

1. In a conveyor system, a frame, an endless chain having a plurality of carriers attached thereto for movement along said frame, each of said carriers having a nest and an opening extending from said nest through the carrier, a plunger mounted on said frame for movement through an aligned opening in a carrier, means for indexing said chain to advance the carriers to move each opening into alignment with said plunger, means for reciprocating the plunger to move through each opening to engage and lift an article from each nest, a slide mounted for movement along said frame to engage and remove an article from said plunger in the elevated position, cam means rendered effective upon said plunger moving through an opening in a carrier for operating said slide, and a rack and pinion means for alternately operating said indexing means and said cam means.

2. In an article advancing apparatus, a frame, a testing head movably mounted on said frame, means for advancing an article into alignment with said testing head, a first cyclically operable means rendered effective upon operation of the article advancing means for moving said head into engagement with said aligned article, a plunger mounted on said frame in alignment with an article being tested, means responsive to said testing head ascertaining a predetermined condition of said article for moving said plunger to lift an article from said advancing means, and a second cyclically operable means for removing an article lifted by said plunger.

3. In an article advancing and ejecting apparatus, a carrier having an opening therethrough, a plunger adapted to move through said opening, means for cyclically advancing the carrier to position the opening in alignment with said plunger, a first cyclically operable means for moving the plunger through said opening each time the opening is in alignment whereby an article on said carrier is engaged and removed, and a second cyclically operable means for ejecting each article from the plunger.

4. In a conveyor system, a frame having an aperture formed therein, a carrier having a nest therein and an aperture formed coaxially with the nest, means for advancing said carrier along the frame to move said apertures into alignment, a plunger slidably mounted on said frame for movement through the aligned apertures in said frame and carrier, means rendered effective upon the advance of the carrier to position said apertures in alignment for sliding said plunger through said apertures to elevate an article from the carrier, an ejector movably mounted on said frame for removing the article elevated by said plunger, and means rendered effective upon movement of the plunger through said aperture for moving said ejector to remove the elevated article from said plunger.

5. In an apparatus for advancing articles, a frame, an endless chain having carriers attached thereto for movement along said frame, each carrier provided with a nest for receiving an article and an opening extending from the nest through the carrier, a testing head movably mounted on said frame and positioned above the path of movement of said carriers, means for indexing said chain to advance each carrier into alignment with said head, cam means rendered effective following each indexing of the chain for moving the head into engagement with an article in the nest, a plunger mounted for movement on said frame through the opening in a carrier positioned in alignment with said testing head, means operated by said testing head engaging an article and ascertaining a predetermined condition for moving said plunger to elevate the tested article from said carrier, a slide cooperable with said plunger for removing a tested article therefrom, cam means rendered effective following advance of said plunger for operating said slide, and means for alternately rendering said indexing and cam means effective.

6. An apparatus for unloading a carrier having an article positioned thereon, which comprises a plurality of pins slidably mounted through the carrier and which are adapted to support the article, means for elevating and lowering the pins to lift an article from the carrier, a plate slidably mounted to move between the pins, means for sliding the plate between the pins while said pins are in the elevated position, a slide mounted on the plate, and means for advancing the slide relative to the plate after the pins have been lowered to move the article from the plate.

7. In an apparatus for advancing articles, a carrier having an aperture extending therethrough, a plurality of pins mounted for movement through said aperture to engage and remove an article from said carrier, means for advancing said carrier to position said aperture in alignment with said pins, means for advancing and withdrawing said pins through said aligned aperture to lift an article from said carrier, a support adapted to be moved between said pins, means for moving said support between said pins when the pins are advanced whereby withdrawal of the pins leaves the article on said support, and an ejector for removing an article from said support.

8. In a conveyor system, a frame, a carrier mounted for movement along said frame, said carrier having an aperture extending therethrough, said frame having an aperture formed therethrough, a plurality of pins mounted for movement through said apertures in said frame and carrier, means for moving the carrier to position the aperture extending therethrough in alignment with the aperture in the frame, means rendered effective upon the carrier being moved for reciprocating the pins through the apertures to lift an article from the carrier, a slide movable between said pins, means for moving said slide between said pins upon the pins being moved to lift an article from the carrier whereby the article is deposited on the slide when said slide is reciprocated to the initial position, an ejector mounted on said slide for movement relative thereto, and means for moving the ejector relative to said slide to engage and remove an article from said slide.

9. In a conveyor system, a frame, a plurality of carriers each having an aperture extending therethrough, a plurality of spaced pins movably mounted on said frame for movement through said aperture in each carrier, a chain means attached to said carriers and adapted to advance each succeeding carrier to position the aperture extending therethrough in alignment with said pins, means for indexing said chain, first cam means rendered effective following each indexing of the chain for advancing and retracting said pins through the aperture in an aligned carrier to lift an article from the carrier, a first slide mounted for movement on said frame and between said pins when said pins are advanced whereby retraction of pins leaves the article deposited on the first slide, second cam means for moving said first slide, a second slide mounted for movement on said frame relative to the first slide to remove an article on said first slide, third cam means for moving said second slide relative to said first slide, and means for alternately operating said indexing means and said cam means.

10. In a conveyor system, a frame, a plurality of spaced pins mounted for movement on said frame, a pressure pad movably mounted on the frame and spaced from the pins, a plurality of carriers on said frame, each of said carriers having an aperture therethrough, means for advancing each carrier between said pins and pressure pad, means for reciprocating the pad into engagement with an article on a carrier, means for moving the pins through the aperture in a carrier to move an article against the pressure pad, a slide movably mounted on said frame for movement between said pins when said pins are moved against the pressure pad, means for moving said slide between the pins whereby the article is deposited on said slide, and an ejector movably mounted on said frame for removing an article on said slide.

11. In a conveyor system, a frame, a plurality of spaced pins movably mounted on said frame, a pad resiliently and movably mounted on said frame in spaced relation to said pins, a plurality of carriers mounted on said frame for movement between said pad and pins, each of said carriers having an aperture formed therein means for indexing each successive carrier between said pad and pins, a first cam means for moving said pad into engagement with an article on a carrier, a second cam means for advancing said pins through the aperture in the carrier to move an article against the resiliently mounted pad, said first cam means acting to remove the pad from said article when said pins move the article from the carrier, a slide mounted on the frame for movement between the advanced pins, a third cam means for moving the slide between said advanced pins, said second cam means being effective to withdraw said pins from the article when the third cam moves the slide between said pins, an ejector mounted on said frame for removing the article from said slide, fourth cam means for operating said ejector when the pins are withdrawn from the article, and cyclically operating means for alternately operating said indexing means and said cam means.

12. In a conveyor system, a frame, an article testing head movably mounted on said frame, a first cyclically operable means mounted on said frame for moving said testing head into and out of engagement with an article, ejecting means mounted on said frame in operative engagement with said first cyclically operable means for actuation thereby substantially simultaneously with the motion of said testing head out of engagement with said article, means mounted on said frame for positioning articles with respect to said testing head and said ejecting means, means responsive to said testing head ascertaining a predetermined condition of said article for lifting said article from said positioning means, second cyclically operable means mounted on said frame for actuating said positioning means, and power means for alternately actuating said first and second cyclically operable means.

13. In a conveyor system a frame, an article testing head movably mounted on said frame, a cyclically driven shaft, means mounted on said shaft for reciprocating said testing head into and out of engagement with an article, ejecting means mounted on said frame and operated by said reciprocating means for actuation thereby substantially simultaneously with the motion of the testing head out of engagement with said article, an intermittently moving conveyor for positioning a series of articles with respect to the testing head and ejecting means, means rendered effective upon said testing head ascertaining a predetermined condition of an article of said series of articles for removing said article from said conveyor, a driven sprocket mounted on said frame for intermittently actuating said conveyor, and a rack means attached to said frame for alternately actuating said driven shaft and said sprocket.

14. In an article advancing apparatus a frame, means movably mounted on the frame for testing articles, means for advancing articles into alignment with said testing means, means rendered effective upon operation of said article advancing means for moving the said testing means into engagement with an aligned article, means responsive to said testing means ascertaining a predetermined condition of said aligned article for lifting said article from said advancing means, and cyclically operable means for removing the article lifted by said lifting means.

References Cited in the file of this patent

UNITED STATES PATENTS

| | | |
|---|---|---|
| 2,293,586 | Bardet | Aug. 18, 1942 |
| 2,315,287 | Holloway | Mar. 30, 1943 |
| 2,678,151 | Geisler | May 11, 1954 |
| 2,803,343 | Dodge | Aug. 20, 1957 |
| 2,986,275 | Glaubke | May 30, 1961 |